United States Patent [19]

Cohen

[11] Patent Number: 5,751,968
[45] Date of Patent: May 12, 1998

[54] SYSTEM AND METHOD FOR DISTRIBUTING MULTI-MEDIA PRESENTATIONS IN A COMPUTER NETWORK

[75] Inventor: Alon Cohen, Rishon LeZion, Israel

[73] Assignee: VocalTec Ltd., Herzlia, Israel

[21] Appl. No.: 647,072

[22] Filed: May 9, 1996

[30] Foreign Application Priority Data

Sep. 12, 1995 [IL] Israel ......................... 115263

[51] Int. Cl.$^6$ .................. G06F 3/14; G06F 13/38; G06F 15/16
[52] U.S. Cl. .............. 395/200.61; 348/13; 348/15; 364/DIG. 1; 364/DIG. 2; 395/200.31
[58] Field of Search ............... 395/200.03, 608, 395/726, 200.31, 210.64, 200.61, 200.62; 348/13.705, 6, 12, 13, 15; 371/32; 364/DIG. 1, DIG. 2, 514 A, 514 C; 379/93.12

[56] References Cited

U.S. PATENT DOCUMENTS

| | | |
|---|---|---|
| 4,903,126 | 2/1990 | Kassatly . |
| 5,191,410 | 3/1993 | McCalley ................................. 348/13 |
| 5,262,964 | 11/1993 | Bonsall et al. ........................ 364/514 A |
| 5,557,541 | 9/1996 | Schulhof et al. . |
| 5,572,442 | 11/1996 | Schulhof et al. . |
| 5,583,561 | 12/1996 | Baker et al. . |
| 5,583,994 | 12/1996 | Rangan . |
| 5,592,626 | 1/1997 | Papadimitriou et al. . |
| 5,594,490 | 1/1997 | Dawson et al. ............................ 348/6 |
| 5,594,936 | 1/1997 | Rebec et al. . |
| 5,602,815 | 2/1997 | Klappert et al. ......................... 369/59 |
| 5,614,940 | 3/1997 | Cobbley et al. . |

OTHER PUBLICATIONS

Architectures for personalized multimedia '—Ramanathan, S; Venkat Rangan, P.—IEEE Multimedia vol: 1 Iss: 1 p. 37–46, Spring 1994, USA.

*Primary Examiner*—Daniel H. Pan
*Attorney, Agent, or Firm*—Darby & Darby

[57] ABSTRACT

A method and a system for distributing a multi-media presentation in a computer network is provided. The method includes the steps of feeding at least one site of said computer network with a stream of data of the presentation and forming, in each site a plurality of data files, each data file including a segment of said multi-media presentation. The method further includes distributing the data files to at least one display and displaying the distributed data files.

12 Claims, 3 Drawing Sheets

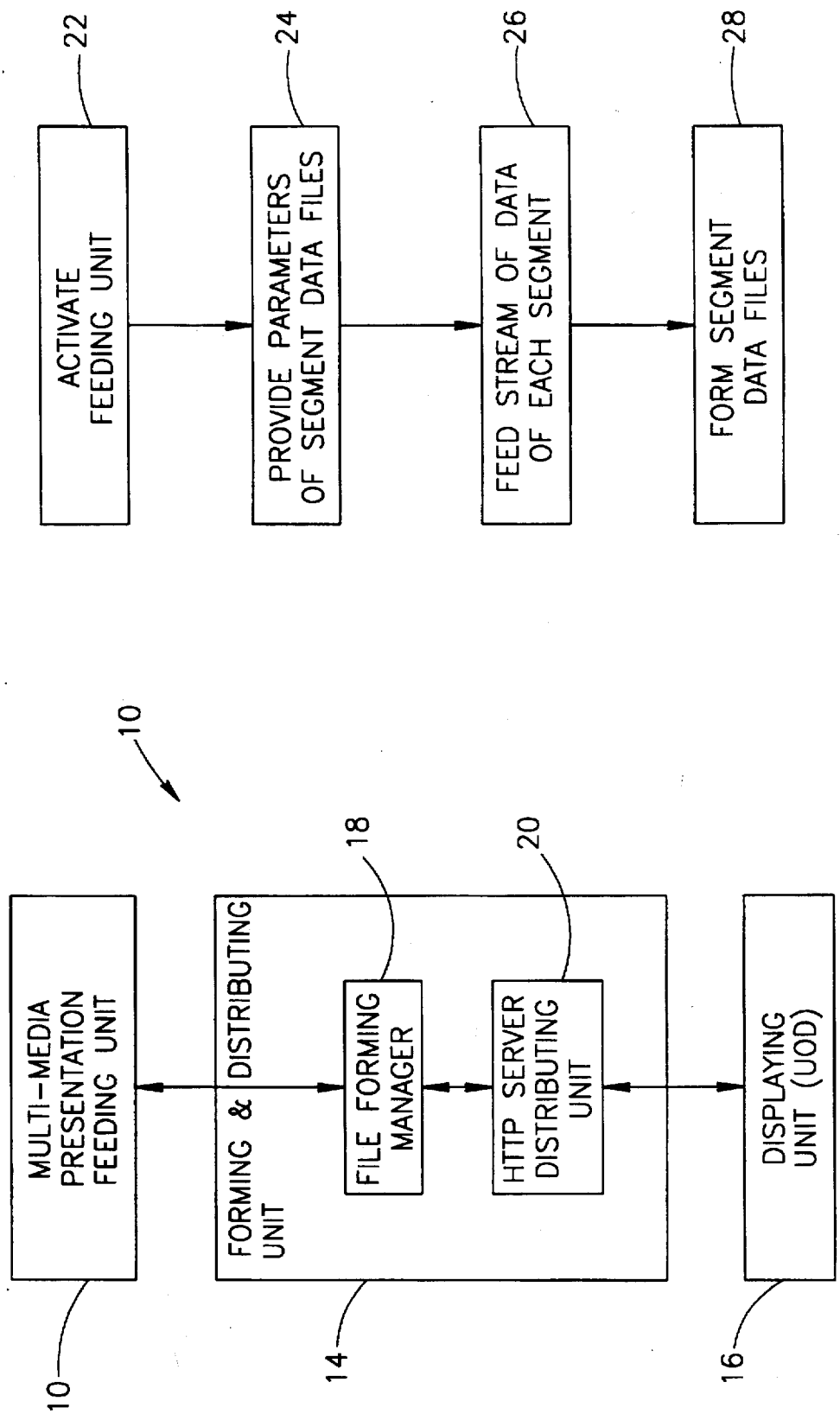

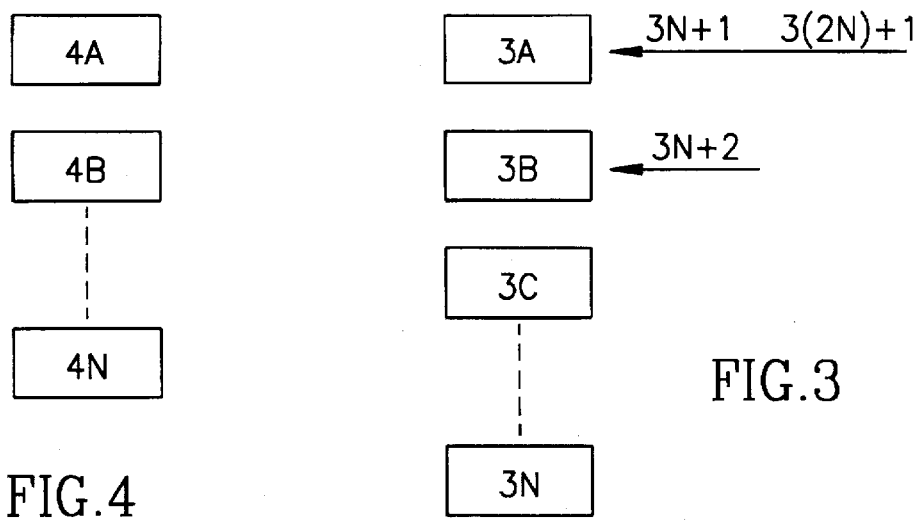
FIG.3
FIG.4
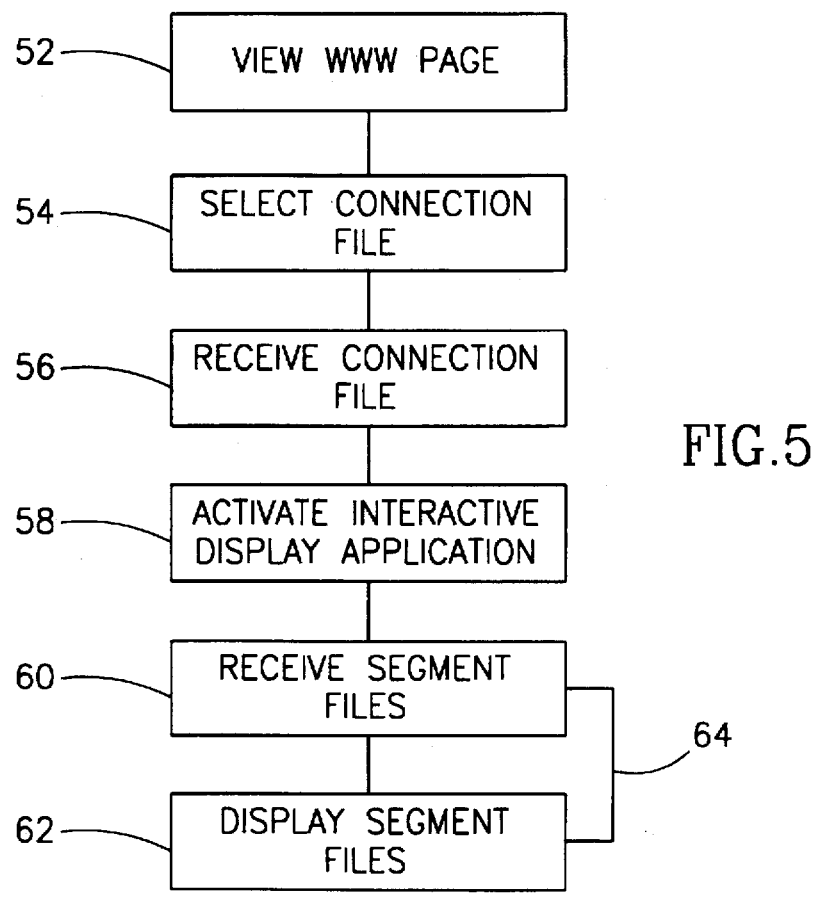
FIG.5

SYSTEM AND METHOD FOR DISTRIBUTING MULTI-MEDIA PRESENTATIONS IN A COMPUTER NETWORK

FIELD OF THE INVENTION

The present invention relates to a method and system for distributing video, audio graphic and textual information on a computer network.

BACKGROUND OF THE INVENTION

Computer networks, in particular the INTERNET network, allow users operating user operated displays (UOD) connected to the network, to receive and display multi-media presentations. Usually, multimedia presentations are stored as files which are downloaded from sites of the network in which they are stored and to which they were fed from any source.

In the prior art, each multi-media file stored in a network site contains all the data of a presentation, i.e. if the multi-media presentation is a video clip of a song, the file stored in the network site includes the video, audio, graphic and textual data of the particular video clip and therefore, when retrieved by a network user, a relatively long delay exists before the user can display the presentation on his computer since the volume of data that needs to be transferred from the network site to the user is very large.

For example, if the multi-media presentation is a 660 Kbyte file, it will be transferred via a 14.4 K modem in about 12 minutes. An example of such 660 Kbyte file is a 1 minute audio file at 11 Ksamp/sec.

SUMMARY OF THE INVENTION

An object of the present invention is to provide an improved method and system for distributing multi-media presentations to users of a computer network.

Another object of the present invention is to provide substantially in real time multi-media presentations to at least one user operating a UOD connected to the network.

A further object of the present invention is to enable a user operating a UOD to selectively display portions of or the entire multi-media presentation. The user operating the UOD may display the presentation with a desired delay, to re-display portions of the presentation or to display portions of the presentation out of order.

It will be appreciated that the term multi-media refers herein to video, audio, graphic, textual, music instrument device interface (midi) or any other digital data, each taken alone or in any combination therebetween. The term display refers herein to the display of any data included in the multi media presentation.

According to an aspect of the present invention, the system enabling the selective display includes a feeding unit which feeds the multimedia presentation, a forming and distribution unit which feeds the multimedia presentation as data files including segments of the presentation and a UOD, all connected in any suitable computer network. Preferably, the data files include consecutive segments of the presentation.

According to a preferred embodiment of the present invention, the computer network is the INTERNET network.

According to a further aspect of the present invention, for the INTERNET network, the forming and distribution unit resides in World Wide Web (WWW) sites. The forming unit and the distribution unit may be either in the same WWW site or in a different WWW site.

According to yet another aspect of the present invention, the forming unit may be part of the feeding unit wherein the distribution unit is a HyperText Transfer Protocol (HTTP) server in a WWW site.

According to yet another aspect of the present invention, additional distribution units located in additional sites of the WWW may retrieve the data files including the segments of the multi-media presentation from the distribution unit and distribute them to additional users employing UODs communicating with these additional sites.

One advantage of the present invention is that the communication protocol employed for connecting the UOD, the HTTP WWW server and the multi-media presentations feeding computer is a communication protocol presently used in the INTERNET, preferably a reliable TCP/IP communication protocol. TCP/IP is compatible with HTTP WWW and browsing applications used for browsing the WWW.

According to a second preferred embodiment of the present invention, the communication protocol is any suitable communication protocol, such as a non-reliable UDP communication protocol.

There is thus provided, according to a preferred embodiment of the present invention, a method for distributing a multi-media presentation in a computer network which includes the following steps:

A. feeding at least one site of the computer network with a stream of data of the presentation;

B. forming, in each site a plurality of data files, each data file including a segment of the multi-media presentation;

C. distributing the plurality of data files to at least one display; and

D. displaying the distributed data files.

In accordance with a preferred embodiment of the present invention, the feeding includes providing at least one parameter characterizing the segment and the forming includes forming consecutive data files, each including the segment in accordance with the at least one parameter.

Further, according to a preferred embodiment of the present invention, the step of forming includes forming the data files as a sequence of files. Alternatively, the step of forming includes forming the data files in a cyclic fashion.

Additionally, according to a preferred embodiment of the present invention, the steps of distributing and displaying include the step of activating an interactive display application operating to receive the distributed data files and to display them in a user selected sequence. Preferably, the user selected sequence is selected from the group which includes displaying a most current file, displaying a formerly formed file, displaying a formerly distributed file, re-displaying displayed files and displaying the files out of order. The most current file refers herein to the file most recently formed by the forming unit.

Further, according to a preferred embodiment of the present invention, the method may include the step of selecting a time lag between the steps of feeding and forming and the steps of distributing and displaying, the time lag determined whether the display is substantially a real time display or a delayed display.

Still further, according to yet another preferred embodiment of the present invention, the step of distributing may also include the step of distributing the data files to additional distribution units operating to distribute the data files to additional displays.

According to a preferred embodiment of the present invention, the computer network is the INTERNET network.

There is also provided, in accordance with a preferred embodiment of the present invention, a method for displaying substantially in a real time a multi-media presentation which includes the steps of:

A. forming data files representing segments of the multi-media presentation; and B. displaying the data files in a user selected sequence, the user selected sequence includes at least one of the group which includes displaying a most current file, displaying a formerly distributed file, re-displaying displayed files and displaying the files out of order.

There is further provided, in accordance with a preferred embodiment of the present invention a system for distributing a multi-media presentation in a computer network which includes:

A. a feeding unit for feeding at least one site of the computer network with a stream of data of the presentation;

B. a forming manager for forming, in each site a plurality of data files, each file including a segment of the multi-media presentation;

C. a distribution unit for distributing the plurality of data files to at least one UOD; and D. a UOD for displaying the distributed data files.

According to a preferred embodiment of the present invention, the computer network is the INTERNET network and the distribution units are one or more HTTP servers in WWW sites.

There is further provided, in accordance with a preferred embodiment of the present invention, a method for distributing a multi-media presentation in a computer network which includes the following steps:

A. feeding at least one site of the computer network with a stream of data of the presentation;

B. forming, in each site a data file including the multi-media presentation;

C. repeating the steps of feeding and forming, thereby rewriting portions of the data of the presentation in a cyclic fashion;

D. distributing, substantially simultaneously with the steps of feeding and forming, the current data file to at least one display; and E. displaying the distributed data file, wherein a selectable time lag exists between the steps of distributing and displaying.

Finally, according to a preferred embodiment of the present invention, there are provided systems which includes units operating to carry out the steps of the methods of the present invention.

BRIEF DESCRIPTION OF THE DRAWINGS

The present invention will be understood and appreciated more fully from the following detailed description taken in conjunction with the appended drawings in which:

FIG. 1 is a schematic block diagram of a multi-media presentation distributing system, constructed according to a preferred embodiment of the present invention;

FIG. 2 is a schematic block diagram illustration of a preferred method for feeding and forming the files of consecutive segments of the multi-media presentation;

FIG. 3 is a schematic illustration of a plurality of files including consecutive segments of the multi-media presentation formed in a cyclic mode;

FIG. 4 is a schematic illustration of a plurality of files including consecutive segments of the multi-media presentation formed in a sequential mode;

FIG. 5 is a schematic block diagram illustration of a preferred method for distributing and displaying the files of segments of the multi-media presentation;

DETAILED DESCRIPTION OF THE PRESENT INVENTION

Figure 6:
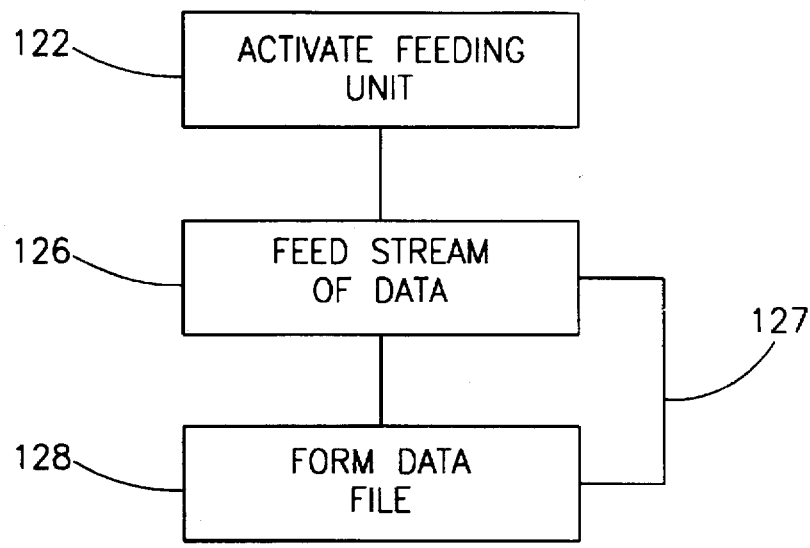
FIG. 6 is a schematic block diagram illustration of an alternative preferred method for feeding and forming a multi-media presentation.

Reference is now made to FIG. 1 which illustrates a multi-media presentation distribution system, constructed according to a preferred embodiment of the present invention.

The system of FIG. 1, generally referenced 10, comprises a multi-media presentation feeding unit 12 for feeding a stream of data which forms the multi-media presentation to be distributed through the computer network via a forming and distribution unit 14 to a plurality of user operated display (UOD) units of which one, referenced 16, is shown herein.

The unit 12 may comprise any suitable means for generating a multi-media presentation. Preferably, it comprises a computer equipped with suitable software and hardware for receiving the multi-media presentation from any suitable source. For example, if the multi-media presentation is an audio presentation, the computer forming the unit 12 will include an audio card capable of receiving audio signals, such as Sound Blaster, manufactured and sold by Creative Lab Technologies of the USA. If the multi-media presentation is a video presentation, the computer forming the unit 12 will include a video card capable of receiving video signals, such as Video Blaster, manufactured and sold by Creative Lab Technologies of the USA.

According to a preferred embodiment of the present invention, the unit 12 receives a real time broadcast of a multi-media presentation, for example an audio presentation from a radio station, and feeds its content to the forming and distribution unit 14.

The forming and distribution unit 14 is preferably a site in a computer network operating to receive the stream of multi-media data from the unit 12 and to form therefrom a plurality of files forming together the multi-media presentation.

According to a preferred embodiment of the present invention, the system is operating to provide substantially in real time the multi-media presentation to the users and therefore the feeding and forming are substantially simultaneous, i.e. the unit 14 receives the stream of data according to parameters defined by the feeding unit 12 and substantially simultaneously forms the files including the segments of the multi-media presentation.

The forming and distribution unit 14 preferably comprises a file forming manager 18 which receives the data of the multi-media presentation and forms data files including segments of the presentation therefrom. Preferably, the data files are consecutive data files representing consecutive segments of the multi-media presentation.

In the illustrated embodiment, the feeding unit 12 and the forming unit 18 are located in different sites of the network.

Alternatively, the forming unit 18 may form part of the feeding unit 12 and not of the forming and distribution unit 14. Also, the feeding unit 12 and the forming and distribution unit 14 may reside together on a single WWW site.

The preferred network of the present invention is the INTERNET network and therefore the distribution unit is preferably an HTTP WWW server 20 which receives the files including segments of the multi-media presentation and is operative to distribute them to any number of UODs of users of the network as described in detail with reference to FIG. 5 hereinbelow.

Additionally, the distribution unit 20 is operative to distribute the data files including segments of the multi-media presentation to additional distribution units (not shown), i.e. HTTP servers in other WWW sites, whereby the multi-media presentation may be distributed substantially simultaneously to even a larger number of users.

Alternatively, each additional distribution unit may receive the data files including segments of the multi-media presentation from a corresponding retrieving unit (not shown) which operates to retrieve the data files from the unit 14 and to transfer it to the corresponding additional distribution unit.

Referring now also to FIG. 2, a preferred method for feeding and forming the files representing consecutive segments of the multi-media presentation is described. The method starts with the step 22 of activating the computer comprising the feeding unit 12.

Next, as shown in block 24, the feeding unit 12 provides the parameters defining the characteristics of the segments of stream of data of the multi-media presentation that are transferred to the file forming manager 18. The stream of data representing each of the files including the segments of the multi-media presentation is then transferred to the file forming manager 18 as indicated by step 26 and the file forming manager forms the files of the data segments of the multi-media presentation (step 28).

The characteristics provided in step 24 may be any suitable characteristics of the segment data files. Non limiting examples include the size of the data file and the cycle size in case the data is provided in a cyclic fashion as described hereinbelow with reference to FIG. 3.

It will be appreciated that the method of FIG. 2 is particularly advantageous in an environment in which it is desired to display the multi-media presentation substantially in real time. While in the prior art the stream of data representing the entire multi-media presentation is transferred to a single file in the HTTP server, thereby causing a relatively long delay between feeding and subsequent non-continuous displaying, the segmented forming of the present invention enables to display the multi-media presentation substantially simultaneously with its feeding and forming.

Furthermore, according to one preferred embodiment of the present invention, as shown in FIG. 3, the files are formed in the HTTP server 20 in a cyclic fashion. In the first cycle, files 3A-3N, i.e. the files allocated to save segments of the multi-media presentation in the first cycle, are formed. The files of the next cycle, i.e. files 3N+1, 3N+2 etc. will replace files 3A, 3B etc., respectively, and the files of a further cycle represented by file 3(2N)+1 will replace file 3N+1 etc.

Forming in a cyclic fashion enables not only to display the multi-media presentation substantially simultaneously but also continuously as new files presenting segments of the multi-media presentation replace older files for any desired period of time.

It will be appreciated that forming the files in the forming unit 18 in a cyclic fashion is particularly advantageous for relatively long real time display of multi-media presentations such as the display of a radio station broadcast to users connected to the network.

According to an alternative embodiment of the present invention, as shown in FIG. 4, the plurality of files may be formed in a sequential mode, i.e. as a string of data files 4A-4N representing the content of the entire multi-media presentation.

Reference is now made to FIG. 5 which is a schematic block diagram illustration of a preferred method for distributing and displaying the files of segments of the multi-media presentation.

The method starts at block 52 where a user views a WWW page on its UOD's display 16. According to a preferred embodiment of the present invention the communication between the UOD 16, the HTTP server 20, and the feeding unit 12 is via a TCP/IP communication protocol, thereby allowing the user to employ existing browsing application, such as the National Center for Supercomputing Applications (NCSA), NCSA Mosaic browser and the NetScape browser, commercially available from Netscape Communication Corp. of California, U.S.A.

The WWW page includes an indication to a connection file which is selected by the user (step 54). Upon selection, the UOD receives the connection file (step 56) which includes reference to an interactive display application capable of receiving and displaying the files of the segments of the multi-media presentation.

In the preferred embodiment, the user activates the interactive display application (step 58) via the browsing application.

The connection file is updated in the WWW and therefore includes the status of all the files currently in the distribution unit 20. Therefore, once the interactive display application is activated, it also receives the current status of the files including the segments of the multi-media presentation.

The interactive display application now has all the pertinent information about the files currently available in the HTTP server and in 60 the user receives the files to be displayed as shown in 62. If the presentation is a real time presentation, the information regarding the status of the files may include the file having the most current segment of the multi-media presentation, the size of cycle and the user options to delay and/or to re-display some of the files. Preferably, the steps 60 and 62 are substantially simultaneous.

It will be appreciated that the steps 60 and 62 may continue in a cyclic fashion as indicated by the cycle 64 substantially simultaneously with the cyclic forming of new files described hereinabove.

It will be appreciated that the time lag between the feeding and forming described with reference to FIG. 2 and the steps of distributing and displaying described with reference to FIG. 5 may be selected by the user. If a substantially real time display is of interest a minimal lag time will be selected and if a delayed display is of interest, the lag therebetween will be longer.

A particular advantage of the present invention is that the user operating the UOD may interact with the displayed presentation to select which part thereof will be displayed. In case of a substantially real time presentation, the user is not limited to displaying the content of the most current part of the presentation. According to the present invention, the user interacts with the interactive display application to select whether to display files which were distributed at an earlier time or the current file, or may "jump" and display only selected files, thereby displaying segments of the multi-media presentation out of order.

Figure 7:
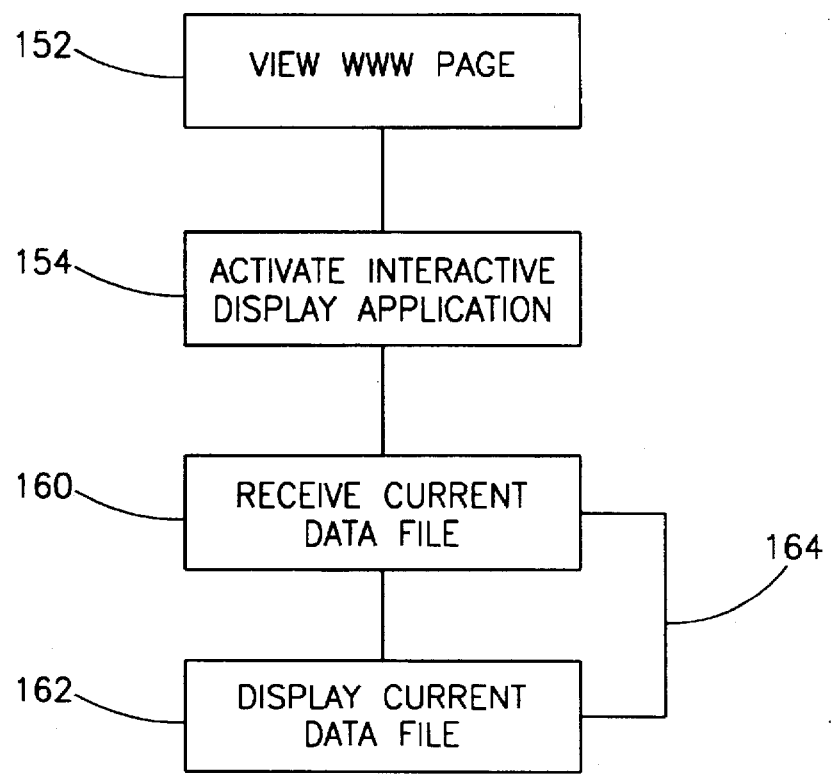
FIG. 7 is a schematic block diagram illustration illustrating the steps of distributing and displaying of the method of FIG. 6.

Reference is now made to FIGS. 6 and 7 which illustrate an alternative embodiment for feeding, forming, distributing and displaying a multi-media presentation employing the system 10 (FIG. 1). In the embodiment of FIG. 6, the feeding unit 12 operates to feed a stream of data (step 126) to the forming unit 18 which forms a single data file therefrom (step 128). The steps 126 and 128 are continuous as indicated by the cycle schematically referenced 127.

It will be appreciated that the cycle 127 effectively forms a data file to which data of the multi-media presentation is written in a cyclic fashion, data which may be displayed substantially simultaneously with the cycle 127 as described with reference to FIG. 7 hereinbelow, provided that there is a sufficient time lag between the step 128 and the display of the same segment by the UOD. This time lag may also be varied selectably by the user.

As shown in FIG. 7, the user views a WWW page on its UOD's 16 (step 152). Then, the user activates an interactive display application capable of receiving and displaying the data file currently formed in step 128 (FIG. 6) employing its UOD browsing application (step 154).

The interactive display application now has all the pertinent information about the file currently available in the HTTP server 20 and in 160 the user receives the file to be displayed as shown in 162. Preferably, the steps 160 and 162 are substantially simultaneous.

It will be appreciated that the steps 160 and 162 may continue in a cyclic fashion as indicated by the cycle 164 substantially simultaneously with the cyclic forming of the data file described in step 127.

It will be appreciated that while the present invention is not limited by what has been described hereinabove and that numerous modifications, all of which fall within the scope of the present invention, exist. For example, while the present invention has been described with reference to the INTERNET network, the method and system of the present invention is not limited thereto and may be employed in any suitable computer network.

Another example is that the data fed by the feeding unit can be compressed and subsequently decompressed by the UOD. Similarly, the data files including segments of the multi-media presentation or the single file may be compressed in the HTTP server and subsequently decompressed in the UOD. These compression and decompression steps may be performed by any suitable compression and decompression algorithm known in the art.

It will be appreciated by persons skilled in the art that the present invention is not limited to what has been particularly shown and described hereinabove. Rather, the scope of the present invention is defined only by the claims that follow:

I claim:

1. A method for distributing a multi-media presentation in a computer network comprising:
    a. feeding at least one site of said computer network with a stream of data of said presentation;
    b. forming, in each site a plurality of data files, each data file including a segment of said multi-media presentation;
    c. distributing said plurality of data files to at least one display;
    d. displaying said distributed data files; and
    e. selecting a time lag between said steps of feeding and forming and said steps of distributing and displaying, said time lag determines whether said displaying is substantially a real time display or a delayed display.

2. The method of claim 1 wherein said feeding comprising providing at least one parameter characterizing said segment and said forming comprising forming consecutive data files, each including said segment in accordance with said at least one parameter.

3. The method of claim 1 wherein said forming comprising forming said data files as a sequence of files.

4. The method of claim 1 wherein said forming comprising forming said data files in a cyclic fashion.

5. The method of claim 1 wherein said distributing and displaying comprising activating an interactive display application operating to receive said distributed data files and to display them in a user selected sequence.

6. The method of claim 5 wherein said user selected sequence is selected from the group consisting of displaying a most current file, displaying a formerly formed file, displaying a formerly distributed file, re-displaying displayed files and displaying the files out of order.

7. The method of claim 1 comprising selecting a time lag between said steps of feeding and forming and said steps of distributing and displaying, said time lag determines whether said displaying is substantially a real time display or a delayed display.

8. A method according to claim 1 wherein said distributing further comprising distributing said data files to additional distribution units operating to distribute said data files to additional displays.

9. A method according to claim 1 wherein said computer network is the INTERNET network.

10. A method for distributing a multi-media presentation in a computer network comprising:
    a. feeding at least one site of said computer network with a stream of data of said presentation;
    b. forming, in each site a data file including said multi-media presentation;
    c. repeating said steps of feeding and forming, thereby rewriting portions of the data of said presentation in a cyclic fashion;
    d. distributing, substantially simultaneously with said steps of feeding and forming, the current data file to at least one display; and
    e. displaying said distributed data file, wherein a selectable time lag exists between said forming and distributing.

11. A system for distributing a multi-media presentation in a computer network comprising:
    a. a feeding unit for feeding at least one site of said computer network with a stream of data of said presentation;
    b. a forming unit for forming, in each site a data file including said multi-media presentation;
    c. means for repeating the operation of said feeding unit and forming unit, thereby rewriting portions of the data of said presentation in a cyclic fashion;
    d. means for distributing, substantially simultaneously with the operation of said feeding unit and forming unit, the current data file to at least one display; and
    e. a UOD for displaying said distributed data file, wherein a selectable time lag exists between said forming and distributing.

12. A method for distributing a multi-media presentation in a computer network comprising:

a. feeding at least one site of said computer network with a stream of data of said presentation;

b. forming, in each site a plurality of data files, each data file including a segment of said multi-media presentation;

c. distributing said plurality of data files to at least one display; and d. displaying said distributed data files, wherein said distributing and displaying comprising activating an interactive display application operating to receive said distributed data files and to display them in a user selected sequence, and wherein said user selected sequence is selected from the group coniisisting of displaying a most current file, displaying a formerly formed file, displaying a formerly distributed file, re-displaying displayed files and displying the files out of order.

* * * * *